United States Patent
Dieguez

(10) Patent No.: US 10,094,409 B1
(45) Date of Patent: Oct. 9, 2018

(54) BOLT USED FOR SECURING A BACKREST CUSHION ON A CHAIR

(71) Applicant: Gerardo Machado Dieguez, Hialeah, FL (US)

(72) Inventor: Gerardo Machado Dieguez, Hialeah, FL (US)

(*) Notice: Subject to any disclaimer, the term of this patent is extended or adjusted under 35 U.S.C. 154(b) by 0 days.

(21) Appl. No.: 15/946,953

(22) Filed: Apr. 6, 2018

(51) Int. Cl.
*F16B 35/04* (2006.01)
*F16B 19/00* (2006.01)
*A47C 7/40* (2006.01)

(52) U.S. Cl.
CPC ............. *F16B 19/00* (2013.01); *A47C 7/40* (2013.01)

(58) Field of Classification Search
CPC .................................. A47C 7/40; A47C 7/42
USPC ............... 411/424, 426, 418, 511, 509, 922
See application file for complete search history.

(56) References Cited

U.S. PATENT DOCUMENTS

| | | | | |
|---|---|---|---|---|
| 409,696 A | * | 8/1889 | Motherwell | |
| 568,456 A | * | 9/1896 | Ohlsen | |
| 860,632 A | * | 7/1907 | Breithut | |
| 1,024,904 A | * | 4/1912 | Martin | F16B 37/043 411/15 |
| 2,120,530 A | * | 6/1938 | Shippee | B64D 29/06 411/349 |
| 3,029,486 A | * | 4/1962 | Raymond | F16B 21/02 174/138 D |
| 3,091,991 A | * | 6/1963 | Baker | E01B 9/12 411/29 |
| 3,893,274 A | * | 7/1975 | Salisbury | E04B 1/4157 411/349 |
| 9,713,384 B1 | * | 7/2017 | Chen | A47C 7/40 |
| 2003/0164639 A1 | * | 9/2003 | Infanti | A47C 4/02 297/440.1 |
| 2004/0126203 A1 | * | 7/2004 | Decamp | F16B 4/00 411/502 |

* cited by examiner

*Primary Examiner* — Gary W Estremsky
(74) *Attorney, Agent, or Firm* — Ruben Alcoba, Esq.

(57) ABSTRACT

A bolt used for securing a back rest cushion on a chair in which the backrest support for the cushion defines an oval aperture. The bolt comprises a head that has a front and a rear side, the front side of the head defines an adjusting point. And, a shank attached to the rear side of the head, the shank has a front, a rear, a top, a bottom, a left and a right side, the top and bottom sides of the shank define an oval groove and the top and bottom sides of the shank are oval shaped, the left and right sides of the front of the shank are flat, and the top, bottom, left and right sides of the shank taper from the front side of the shank toward the rear side of the shank.

3 Claims, 4 Drawing Sheets

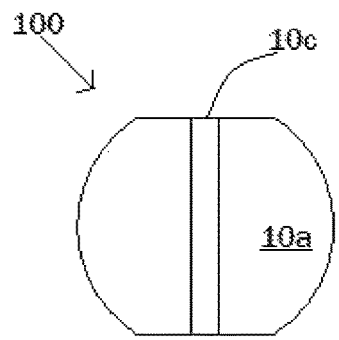
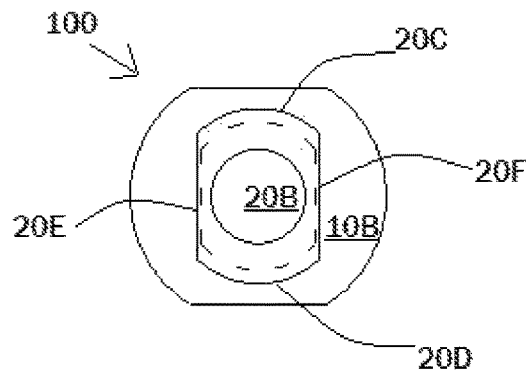
FIG. 2      FIG. 3
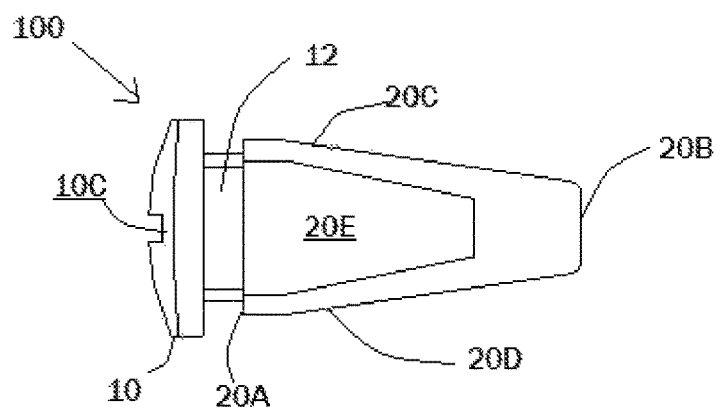
FIG. 4

BOLT USED FOR SECURING A BACKREST CUSHION ON A CHAIR

BACKGROUND

The present invention is directed to a bolt that is used to secure a backrest cushion on the backrest of a chair.

The inventor of the present invention is in the party rental industry and often has to secure different decorative backrest cushions on backrest of chairs.

In his line of business it is important that the backrest cushions be secured to the backrests in a manner in which the cushions are not damaged when placed on the backrest.

It is also important that the backrest cushion be quickly installed and removed from the backrests of chairs.

He decided that the best method of avoiding the backrest cushions from being damaged and secured to backrest of the chairs would be to design backrest cushions that had openings to receive bolts, and that the openings would not require the bolts to be secured to the backrest cushions.

The backrest of chairs, in which the bolts of the present invention would be used, define at least one oval opening that would be aligned to the openings of the backrest of cushions when the cushions are inserted within the backrest of the chairs.

The bolt would secure the backrest cushion to the backrest of the chair, after the openings of the backrest cushion and the backrest of the chairs are aligned, by first inserting a bolt within the oval opening of the back rest of the chair and the opening of the backrest cushion and then simply turning the bolt from a first position to a second position.

For the foregoing reason there is a need for a bolt that can easily be used to secure a backrest cushion within the backrest of a chair.

SUMMARY

The present invention describes a bolt that is used to secure a backrest cushion on a backrest of a chair.

The bolt comprises: a head that has a front and a rear side, the front side of the head defines an adjusting point; and a shank attached to the rear side of the head, the shank has a front, a rear, a top, a bottom, a left and a right side, the top and bottom sides of the shank define an oval groove and the top and bottom sides of the shank are oval shaped, the left and right sides of the front of the shank are flat, and the top, bottom, left and right sides of the shank taper from the front side of the shank toward the rear side of the shank.

The shank is oblong shaped and in one position passes through the oval openings of the backrest of the chair and in a second position is locked onto the edges surrounding the oval openings of the backrest of the chair. The oval groove of the shank is what permits the locking of the bolt onto the backrest of the chair. The bolt, because of its oblong design, can only turn a certain degree within the oval opening of the backrest of the chair. The bolt locks on the backrest of the chair upon that certain degree being reached. The certain degree can be at least two degrees.

An object of the present invention is to provide a bolt that can be used to quickly secure a backrest cushion on the backrest of a chair.

Another object of the present invention is to provide a bolt that will protect a backrest cushion from being damaged when it is secured on a chair.

DRAWINGS

These and other features, aspects, and advantages of the present invention will become better understood with regards to the following description, appended claims, and drawings where:

FIG. 2 is a front plan view of the bolt of the present invention;

FIG. 3 is rear plan view of the present invention;

FIG. 4 is a left side view of the present invention;

DESCRIPTION

Figure 1:
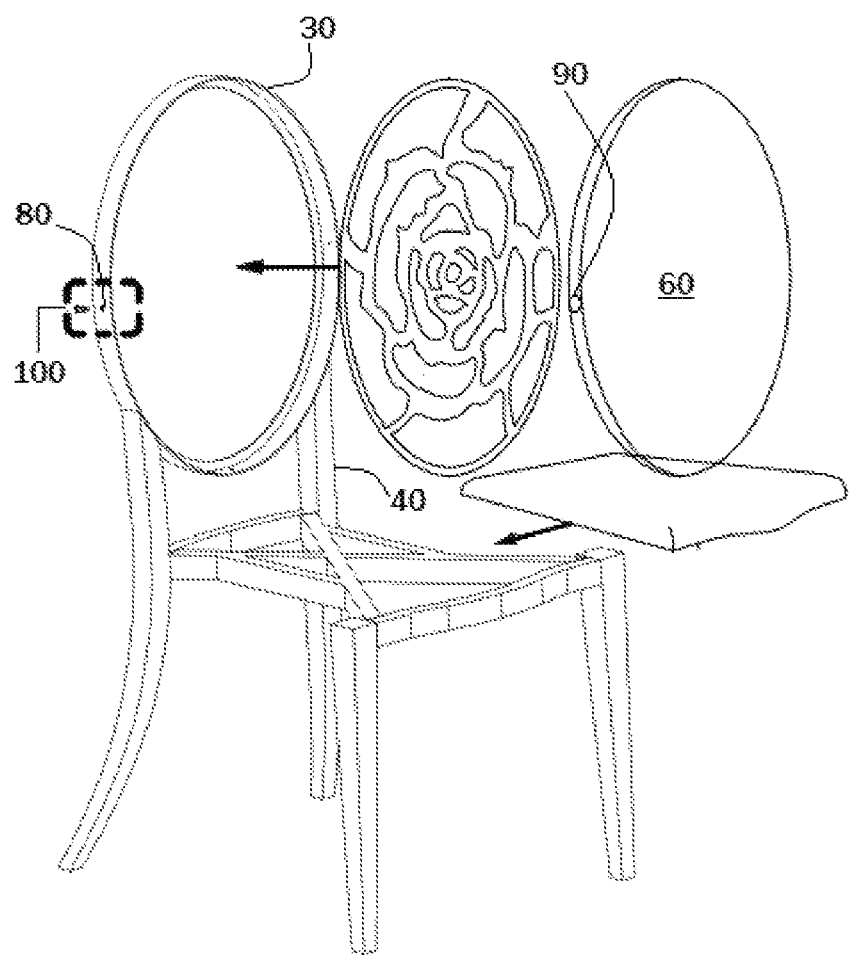
FIG. 1 is a perspective view that shows how the invention is used on a chair.
Figure 5:
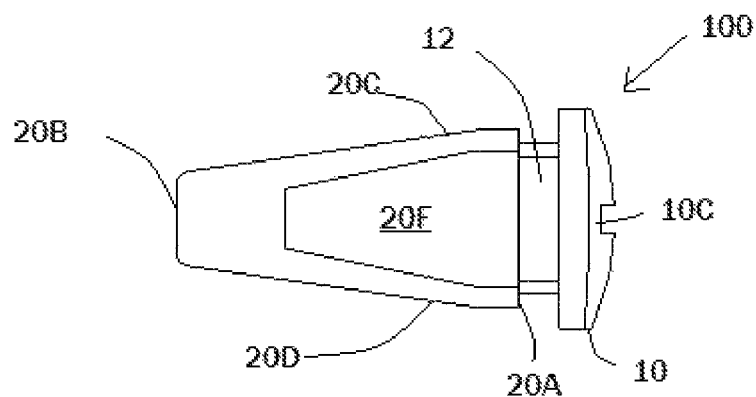
FIG. 5 is a right side view of the present invention.
Figure 6:
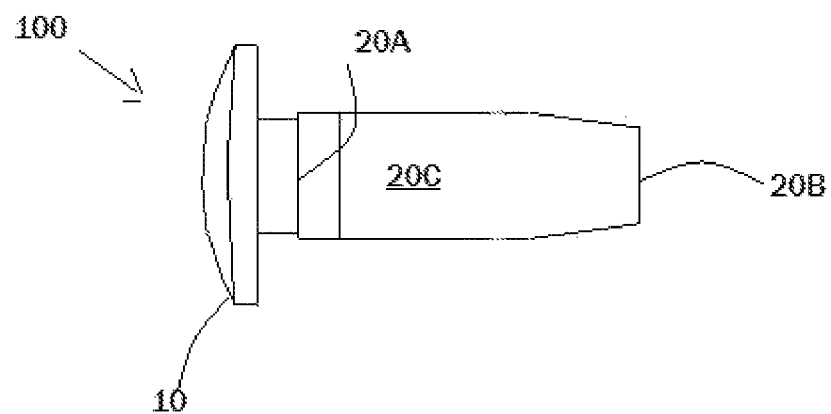
FIG. 6 is a top side view of the present invention.
Figure 7:
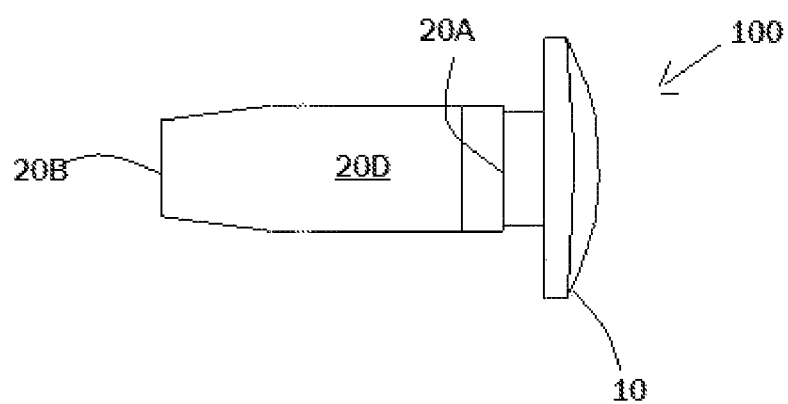
FIG. 7 is a bottom side view of the present invention.

As seen in FIGS. 1-7, the present invention describes a bolt 100 that is used to secure a backrest cushion on the backrest of a chair. The bolt 100 comprises: a head 10 that has a front 10*a* and a rear side 10*b*, the front side of the head 10*a* defines an adjusting point 10*c*; and a shank 20 attached to the rear side of the head 10*b*, the shank 20 has a front 20*a*, a rear 20*b*, a top 20*c*, a bottom 20*d*, a left 20*e* and a right side 20*f*, the top 20*c* and bottom sides 20*d* of the shank 20 define an oval groove 12 and the top 20*c* and bottom sides 20*d* of the shank are oval shaped, the left 20*e* and right sides 20*f* of the front of the shank are flat, and the top 20*c*, bottom 20*d*, left 20*e* and right sides 20*f* of the shank taper from the front side 20*a* of the shank 20 toward the rear side 20*b* of the shank 20.

The shank 20 is oblong shaped and in one position passes through an oval openings 80 of the backrest 30 of the chair 40 and in a second position is locked onto the edges (not shown in figures) surrounding the oval openings of the backrest 30 of the chair 40. The oval groove 12 of the shank 20 is what permits the locking of the bolt 100 onto the backrest 30 of the chair 40. The bolt 100, because of its oblong design, can only turn a certain degree within the oval opening of the backrest of the chair 30, and the bolt 100 being locked on the backrest of the chair 30 upon that certain degree being reached. The certain degree can be at least two degrees.

The backrest of chairs 30, in which the bolts 100 of the present invention would be used, define at least one oval opening 80 that would be aligned to an opening 90 of the backrest of cushions 60 when the cushions 60 are inserted within the backrest 30 of the chairs 40.

An advantage of the present invention is that it provides a bolt that can be used to quickly secure a backrest cushion on the backrest of a chair.

Another advantage of the present invention is that it provides a bolt that protects a backrest cushion from being damaged when it is secured on a chair.

While the inventor's above description contains many specificities, these should not be construed as limitations on the scope, but rather as an exemplification of several preferred embodiments thereof. Accordingly, the scope should not be determined by the embodiments illustrated, but by the appended claims and their legal equivalents.

What is claimed is:

1. A bolt securing a back rest cushion on a chair, the bolt comprises:

a head that has a front and a rear side, the front side of the head defines an adjusting point; and a shank attached to the rear side of the head, the shank has an axial front and rear, and comprises a circumferential top, bottom, left and right side, and wherein the left and right side includes flat portions and overall tapers in a direction away from the head to mirror the shank and wherein the shank is integrally connected to the head by a grooved portion there between, and the grooved portion comprises a circumferential top, bottom, left and right side and wherein the top and bottom sides define oval segments and the left and right sides are substantially flat.

2. The bolt securing a back rest on a chair of claim 1, wherein the shank is oblong shaped.

3. The bolt securing a back rest on a chair of claim 2, wherein the bolt has been inserted and secured within the oval aperture that is defined in the backrest support after the back rest cushion has been inserted within the backrest support.

\* \* \* \* \*